US012747770B2

(12) United States Patent
Kadota et al.

(10) Patent No.: US 12,747,770 B2
(45) Date of Patent: Sep. 29, 2026

(54) SHOCK ABSORBER

(71) Applicant: Hitachi Astemo, Ltd., Hitachinaka (JP)

(72) Inventors: Nao Kadota, Hitachinaka (JP); Yuka Kubotera, Hitachinaka (JP); Takashi Nakagawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 248 days.

(21) Appl. No.: 18/637,094

(22) Filed: Apr. 16, 2024

(65) Prior Publication Data

US 2024/0344588 A1 Oct. 17, 2024

(30) Foreign Application Priority Data

Apr. 17, 2023 (JP) ................................. 2023-066866

(51) Int. Cl.

| | |
|---|---|
| ***F16F 9/38*** | (2006.01) |
| ***F16F 9/32*** | (2006.01) |
| ***F16F 13/00*** | (2006.01) |
| *B60G 15/06* | (2006.01) |

(52) U.S. Cl.

CPC .......... *F16F 13/007* (2013.01); *B60G 15/063* (2013.01); *B60G 2202/312* (2013.01); *B60G 2206/40* (2013.01); *B60G 2206/72* (2013.01); *B60G 2800/162* (2013.01); *F16F 2224/0208* (2013.01); *F16F 2226/04* (2013.01)

(58) Field of Classification Search

CPC .......... F16F 9/3235; F16F 9/38; F16F 13/007; F16F 2224/0208; F16F 2226/04; B60G 15/063; B60G 2202/312; B60G 2206/40; B60G 2206/72; B60G 2800/162

See application file for complete search history.

(56) References Cited

U.S. PATENT DOCUMENTS

| | | | | | |
|---|---|---|---|---|---|
| 2,902,274 | A * | 9/1959 | Mcintyre | B60G 15/063 | 267/221 |
| 4,521,002 | A * | 6/1985 | Adorjan | B60G 15/063 | 267/221 |
| 5,996,982 | A * | 12/1999 | Bell | F16F 13/00 | 267/221 |
| 9,162,548 | B1 * | 10/2015 | Wakeman | F16F 1/121 | |
| 11,472,250 | B2 * | 10/2022 | Yamamoto | F16F 13/005 | |
| 12,077,028 | B2 * | 9/2024 | Smith | B60G 15/065 | |
| 12,128,723 | B2 * | 10/2024 | D'Orazio | B60G 15/065 | |
| 12,546,377 | B2 * | 2/2026 | Kadota | F16F 13/007 | |

(Continued)

*Primary Examiner* — Thomas W Irvin

(74) *Attorney, Agent, or Firm* — Leason Ellis LLP; Edward J. Ellis; Melvin C. Garner

(57) ABSTRACT

A shock absorber includes a cylinder, a slider coaxially provided outside of the cylinder and movable in a direction along an axis of the cylinder, a first spring abutting against the slider and urging the slider in one direction along the axis, a second spring abutting against the slider and urging the slider in the other direction along the axis, a sleeve provided between the cylinder and the slider, a first restriction portion fixed to the cylinder and abutting against one end of the sleeve to restrict a movement of the sleeve in the one direction, a second restriction portion located outside of the cylinder and abutting against the other end of the sleeve to restrict a movement of the sleeve in the other direction, and a fixing member penetrating the sleeve in a radial direction to restrict a movement of the second restriction portion with respect to the cylinder.

9 Claims, 4 Drawing Sheets

(56) References Cited

U.S. PATENT DOCUMENTS

| | | | | |
|---|---|---|---|---|
| 2002/0038929 | A1* | 4/2002 | Now .................... | B60G 17/021<br>267/217 |
| 2021/0276385 | A1* | 9/2021 | Smith .................. | B60G 15/065 |
| 2021/0300139 | A1* | 9/2021 | D'Orazio .................. | F16F 3/04 |
| 2022/0266646 | A1* | 8/2022 | Yamamoto ............. | B60G 15/04 |
| 2024/0344587 | A1* | 10/2024 | Kadota ................. | F16F 13/007 |
| 2025/0026166 | A1* | 1/2025 | D'Orazio .............. | F16F 13/007 |

* cited by examiner

SHOCK ABSORBER

CROSS-REFERENCE TO RELATED APPLICATIONS

This application claims the benefit of priority under 35 USC 119 to Japanese Patent Application No. 2023-066866 filed on Apr. 17, 2023, the entire content of which is incorporated herein by reference.

FIELD OF THE INVENTION

The present disclosure relates to a shock absorber.

BACKGROUND OF THE INVENTION

For example, a vehicle is provided with a shock absorber between a wheel and a vehicle body in order to reduce vibration received by the wheel from the ground. US2021-0300139A discloses a technique related to the shock absorber in the related art.

As disclosed in US2021-0300139A, a shock absorber includes an aluminum shock body having a cylindrical shape, an iron sleeve that surrounds an outer peripheral surface of the shock body, a primary spring and a tender spring that are provided along an outer peripheral surface of the sleeve, and a spring coupler that is provided between the primary spring and the tender spring, which receives an urging force from both the primary spring and the tender spring, and which can be displaced along the outer peripheral surface of the sleeve.

The sleeve is fixed to the outer periphery of the shock body by a snap ring provided between an inner peripheral surface of the sleeve and the outer peripheral surface of the shock body.

According to the shock absorber disclosed in US2021-0300139A, it is necessary to provide a snap ring between the inner peripheral surface of the sleeve and the outer peripheral surface of the shock body. Since the snap ring is provided between the two cylindrical bodies, the snap ring cannot be visually recognized from the outside. It is required to improve this respect.

SUMMARY OF THE INVENTION

The object of the present disclosure is to provide a shock absorber that can be easily assembled.

As a result of intensive studies, the present inventors have found that it is possible to provide a shock absorber that can be easily assembled by providing a one side movement restriction portion that restricts a movement of a sleeve in a first direction by abutting against one end of the sleeve and an other side movement restriction portion that restricts a movement of the sleeve in a direction opposite to the first direction by abutting against the other end of the sleeve. The present invention was completed based on this finding.

Hereinafter, an aspect of the present disclosure will be described.

According to an aspect of the present disclosure, there is provided a shock absorber including:

- a cylinder that is a cylindrical member;
- a slider being cylindrical-shaped, coaxially provided on an outer periphery of the cylinder, and configured to move in a direction along an axis of the cylinder;
- a first spring abutting against the slider, and urging the slider in a first direction that is one direction along the axis;

- a second spring abutting against the slider, and urging the slider in a direction opposite to the first direction;
- a sleeve being substantially cylindrical-shaped, and provided between the outer periphery of the cylinder and an inner periphery of the slider;
- a one side movement restriction portion being fixed to the cylinder, and abutting against one end of the sleeve to restrict a movement of the sleeve in the first direction;
- an other side movement restriction portion being located on the outer periphery of the cylinder, and abutting against an other end of the sleeve to restrict a movement of the sleeve in the direction opposite to the first direction; and
- a fixing member penetrating the sleeve in a radial direction to restrict a movement of the other side movement restriction portion with respect to the cylinder.

According to the aspect of the present disclosure, it is possible to provide a shock absorber that can be easily assembled.

BRIEF DESCRIPTION OF THE DRAWINGS

Exemplary embodiment(s) of the present invention will be described in detail based on the following figures, wherein.

DETAILED DESCRIPTION OF THE INVENTION

An embodiment of the present disclosure will be described below with reference to the accompanying drawings. The embodiment shown in the accompanying drawings is an example of the present invention, and the present invention is not limited to the embodiment.

<Embodiment>

Figure 1:
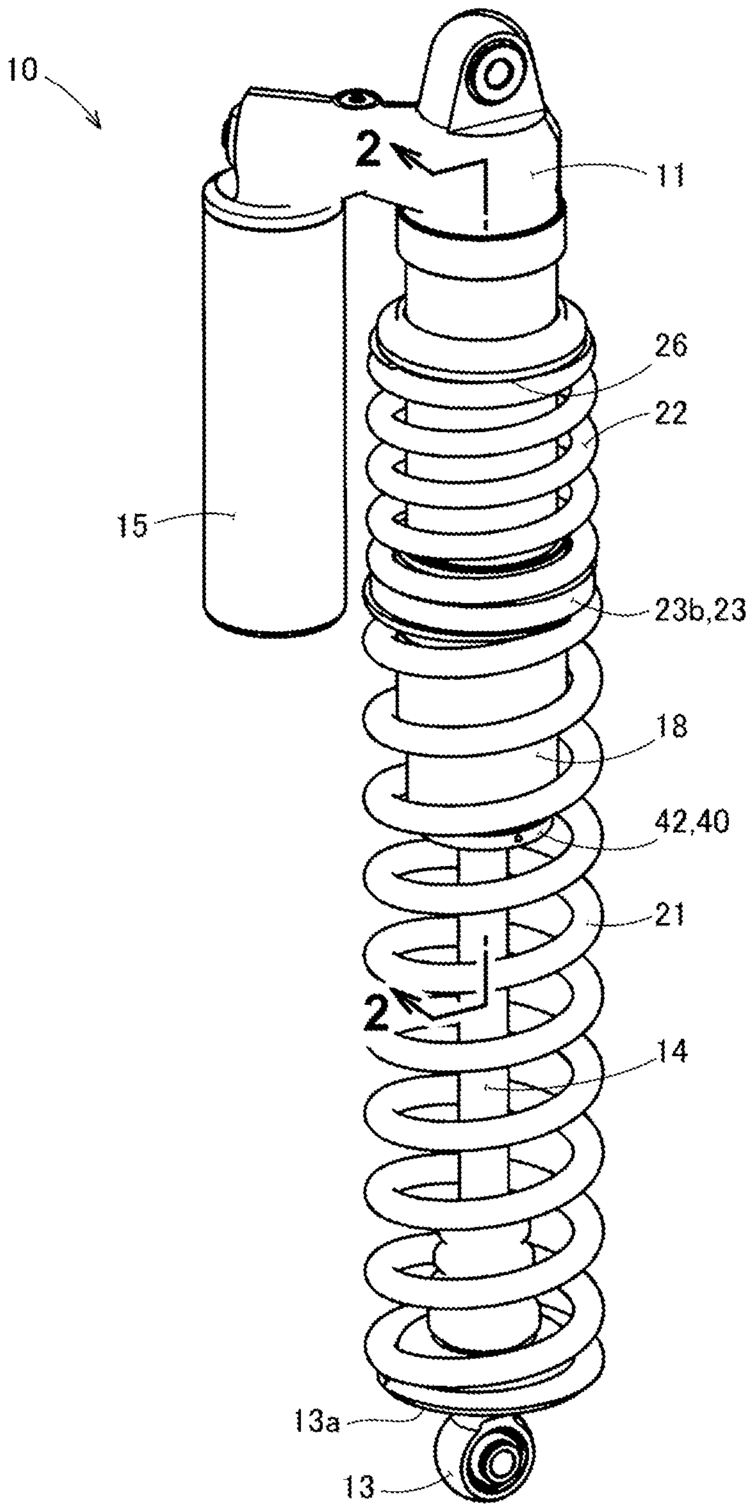
FIG. 1 is an overall view of a shock absorber according to an embodiment.

Reference is made to FIG. 1. A shock absorber 10 is, for example, a shock absorber mounted on a side-by-side vehicle.

The shock absorber 10 is, for example, a hydraulic shock absorber whose upper end is fixed to the vehicle body, whose lower end is fixed to a suspension arm provided on the side portion of the wheel, and that generates a damping force using oil filled inside. This will be described in detail below.

Figure 2:
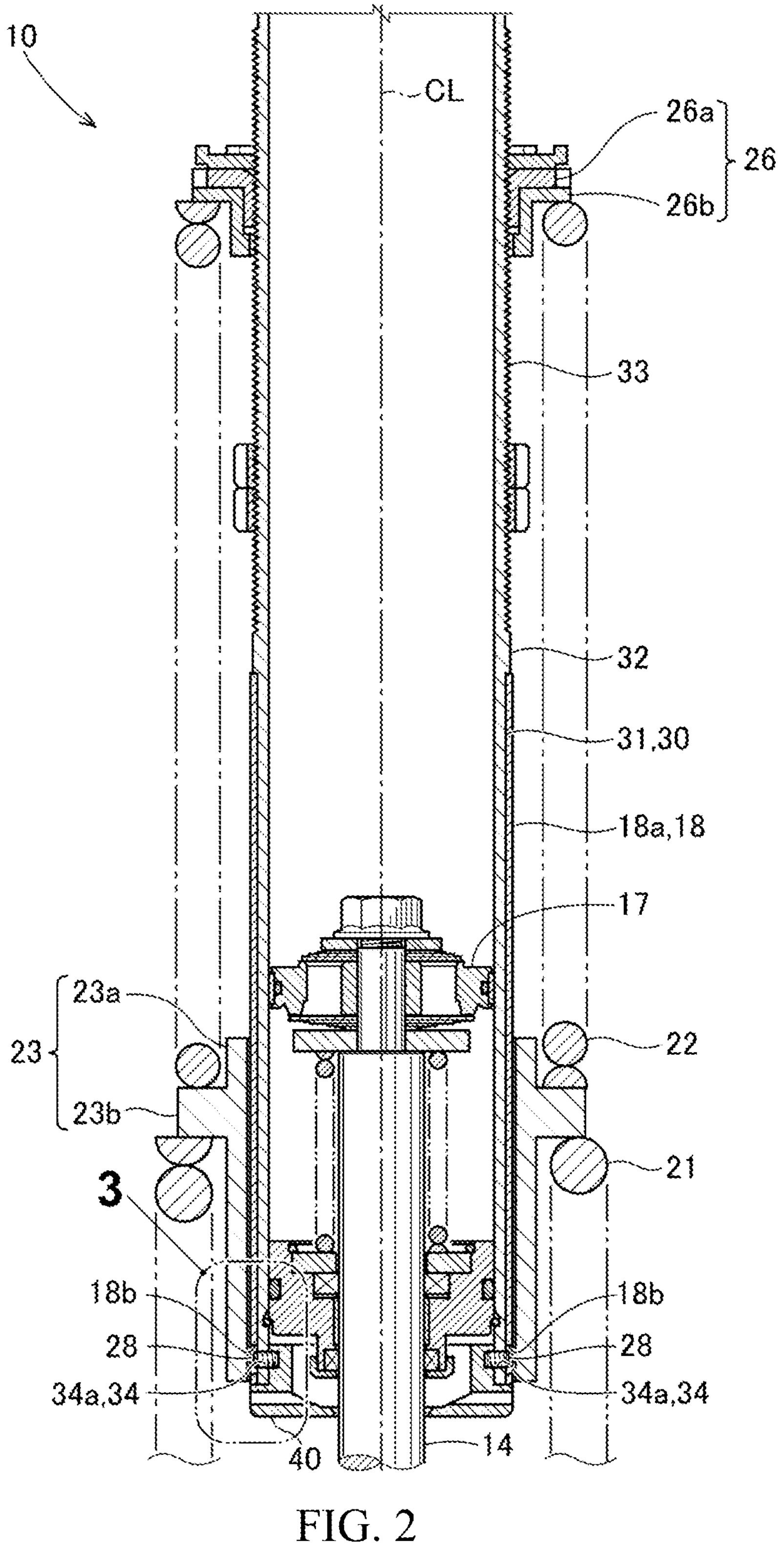
FIG. 2 is a cross-sectional view taken along a line 2-2 in FIG. 1.

Reference is also made to FIG. 2. The shock absorber 10 includes an upper lid body 11 located at the upper end and fixed to the rear portion of the vehicle body, a cylinder 30 whose upper end is fixed to the upper lid body 11 and that is formed in a substantially cylindrical body, a lower end fixing portion 13 located at the lower end and fixed to the lateral side of the wheel, a round rod 14 extending from the lower end fixing portion 13 to the inside of the cylinder 30, and a sub tank 15 connected to the upper lid body 11 and into which oil flows when a force in the compression direction is applied to the inside of the cylinder 30.

The shock absorber 10 further includes a lower lid body 40 that closes the lower end of the cylinder 30, a piston 17 that is supported on the distal end of the rod 14 and that can move forward and backward in the cylinder 30 along an axis CL of the cylinder 30, a cylindrical sleeve 18 provided along the outer peripheral surface of the cylinder 30, a first spring

21 and a second spring 22 that surround the periphery of the sleeve 18, a slider 23 that is provided between the first spring 21 and the second spring 22 and that is displaceable along the outer peripheral surface of the sleeve 18, and a spring receiving member 26 that is provided on the outer periphery of the cylinder 30 and that receives the upper end of the second spring 22.

Figure 3:
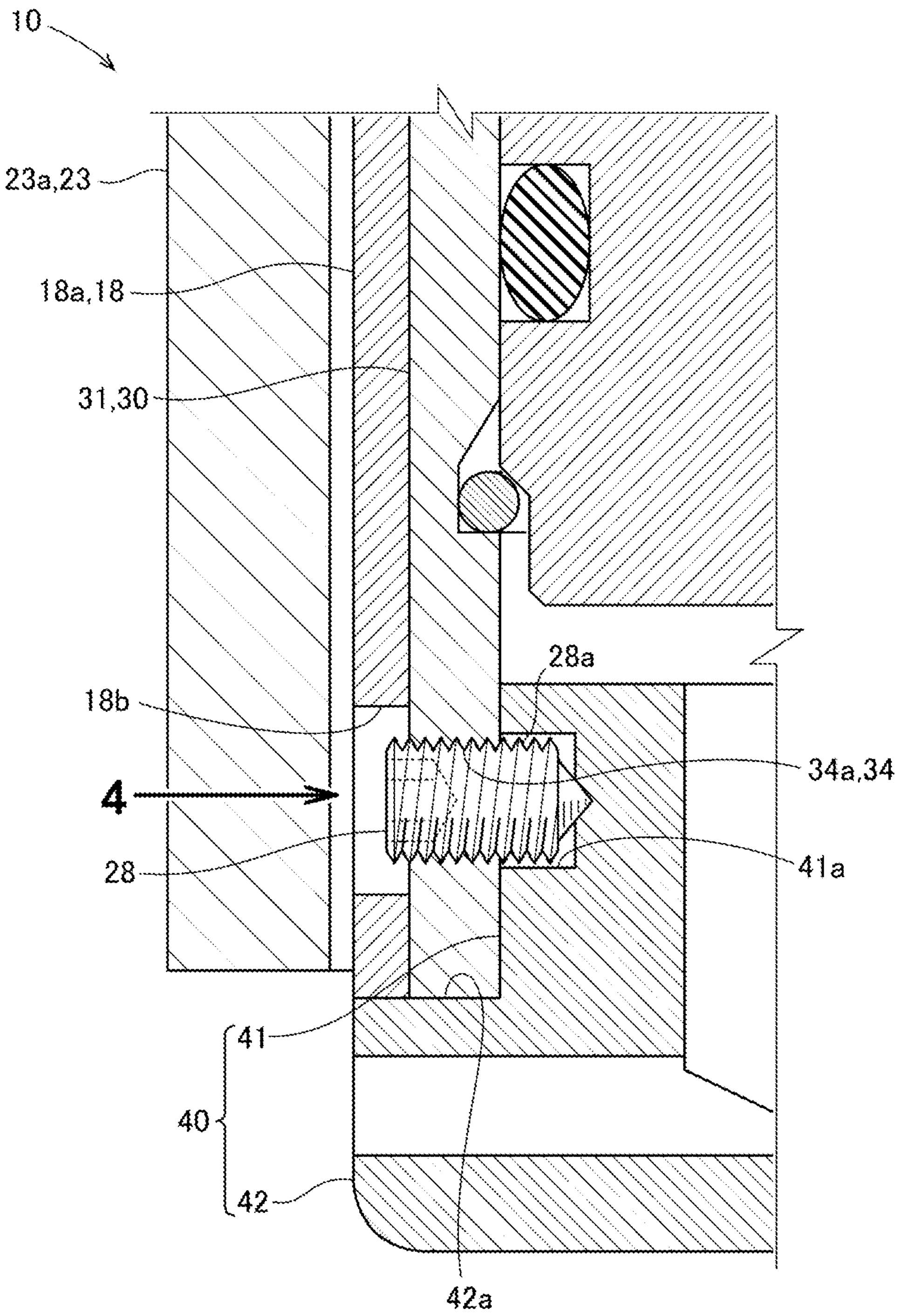
FIG. 3 is an enlarged view of a part 3 in FIG. 2.

Reference is made to FIG. 3. A fixing member 28 that is implemented by a hexagon socket set screw and that restricts a movement of the lower lid body 40 in the axial direction is fastened to the cylinder 30. Since the fixing member 28 partially overlaps the sleeve 18, the rotation of the sleeve 18 is also restricted. The fixing member 28 is provided at a plurality of positions in the circumferential direction. At least a part of the outer periphery of the fixing member 28 preferably includes a male screw portion 28*a* formed in a male thread shape.

The distal end of the fixing member 28 is located closer to the axis CL (see FIG. 2) than is the outer peripheral surface of the lower lid body 40, and the tip of the fixing member 28 is located radially outward from the inner peripheral surface of the sleeve 18. The distal end of the fixing member 28 bites into the bottom of a recess 41*a* of the lower lid body 40.

The fixing member 28 is not limited to the hexagon socket set screw as long as the movement of the lower lid body 40 relative to the cylinder 30 can be restricted. For example, the fixing member 28 can be implemented by different types of screws such as a countersunk machine screw and a round countersunk machine screw, bolts such as a hexagon socket head bolt and a low head bolt, and a solid or hollow pin. It is preferable for the fixing member 28 to include the male screw portion 28*a*, since the fixing member 28 is less likely to be removed than when a C-ring is used to prevent the sleeve 18 from coming off.

The number of fixing members 28 may be one, and it is not necessary to provide a plurality of fixing members 28. When a plurality of fixing members 28 are provided, the number of fixing members 28 provided can be freely selected.

Reference is made to FIG. 1. The upper lid body 11 closes the upper end (one end) of the cylinder 30 and has a flow path for guiding the oil pushed out from the cylinder 30 to the sub tank 15.

Reference is made to FIG. 2. The axis CL of the cylinder 30 coincides with the axis CL of the rod 14. An aluminum alloy, for example, is used as the material of the cylinder 30. The hardness of the cylinder 30 made of the aluminum alloy is HV45 to HV100.

The cylinder 30 includes a cylindrical cylinder main body 31 provided with the sleeve 18 on the outer periphery thereof, a one side movement restriction portion 32 that is formed above the cylinder main body 31 and that restricts a movement of the sleeve 18 in the upward direction (the one direction), a cylinder male screw portion 33 whose outer periphery is formed in a male screw shape above the one side movement restriction portion 32, and cylinder holes 34 opened at a plurality of locations in the lower portion of the cylinder main body 31.

The one side movement restriction portion 32 is formed continuously from the cylinder main body 31. The inner diameter of the one side movement restriction portion 32 is the same as the inner diameter of the cylinder main body 31. On the other hand, the outer diameter of the one side movement restriction portion 32 is larger than the outer diameter of the cylinder main body 31. The lower surface of the one side movement restriction portion 32 abuts against the upper end of the sleeve 18.

The one side movement restriction portion 32 does not necessarily need to be integrally formed with the same member as the cylinder main body 31. If the upward movement of the sleeve 18 can be restricted, the configuration can also be used in which a separate ring-shaped member is fixed to the outer peripheral surface of the cylinder main body 31.

Reference is made to FIG. 3. The cylinder holes 34 are formed at regular intervals in the circumferential direction and penetrate the cylinder main body 31. The inner peripheral surface of the cylinder hole 34 is a female screw portion 34*a* formed in a female screw shape. The fixing member 28 is fastened to the cylinder hole 34.

Reference is made to FIG. 1. A spring receiving portion 13*a* that receives the lower end (the other end) of the first spring 21 is formed at the upper end of the lower end fixing portion 13.

Reference is made to FIG. 3. The lower lid body 40 closes the other end of the cylinder 30, and has a hole in the center through which the rod 14 (see FIG. 2) passes. The lower lid body 40 includes a small diameter portion 41 abutting against the inner peripheral surface of the cylinder 30, and a large diameter portion 42 that is formed integrally with the small diameter portion 41 and that has a diameter larger than that of the small diameter portion 41.

A groove-shaped recess 41*a* that is continuously recessed in the circumferential direction toward the axis CL is formed on the outer periphery of the small diameter portion 41.

The recess 41*a* does not need to be continuous in the circumferential direction, and may be formed corresponding to the cylinder hole 34. In this case, the inner peripheral surface of the recess 41*a* can also be formed into a female screw portion having a female screw shape.

The lower end of the cylinder 30 and the lower end of the sleeve 18 abut against a step surface 42*a* of the large diameter portion 42 that is a step from the small diameter portion 41. Accordingly, the sleeve 18 is restricted from moving downward (in the opposite direction). In this respect, the lower lid body 40 can be referred to as the other side movement restriction portion 40. Hereinafter, the lower lid body 40 may be referred to as the other side movement restriction portion 40.

The other side movement restriction portion 40 may not be implemented by the lower lid body 40 as long as the downward movement of the sleeve 18 can be restricted. For example, a separate ring-shaped member may be fixed to the outer periphery of the cylinder 30.

Reference is made to FIG. 2. The piston 17 can move up and down in the cylinder 30. When the piston 17 moves up and down in the cylinder 30, oil passes through the inside of the piston 17, and a damping force can be generated.

The sleeve 18 is sandwiched between the one side movement restriction portion 32 and the other side movement restriction portion 40, so that movement of the sleeve 18 in the axial direction is restricted. The sleeve 18 has substantially uniform inner and outer diameters throughout, and the axis CL of the sleeve 18 coincides with the axis CL of the cylinder 30. As the material of the sleeve 18, for example, stainless steel is used. The hardness of the sleeve made of stainless steel is HV180 to HV650.

In order to improve the protection performance of the cylinder 30, the sleeve 18 is made of a material harder than the cylinder 30. By preventing wear of the cylinder 30, a decrease in strength and deterioration in appearance and merchantability can be prevented.

Figure 4:
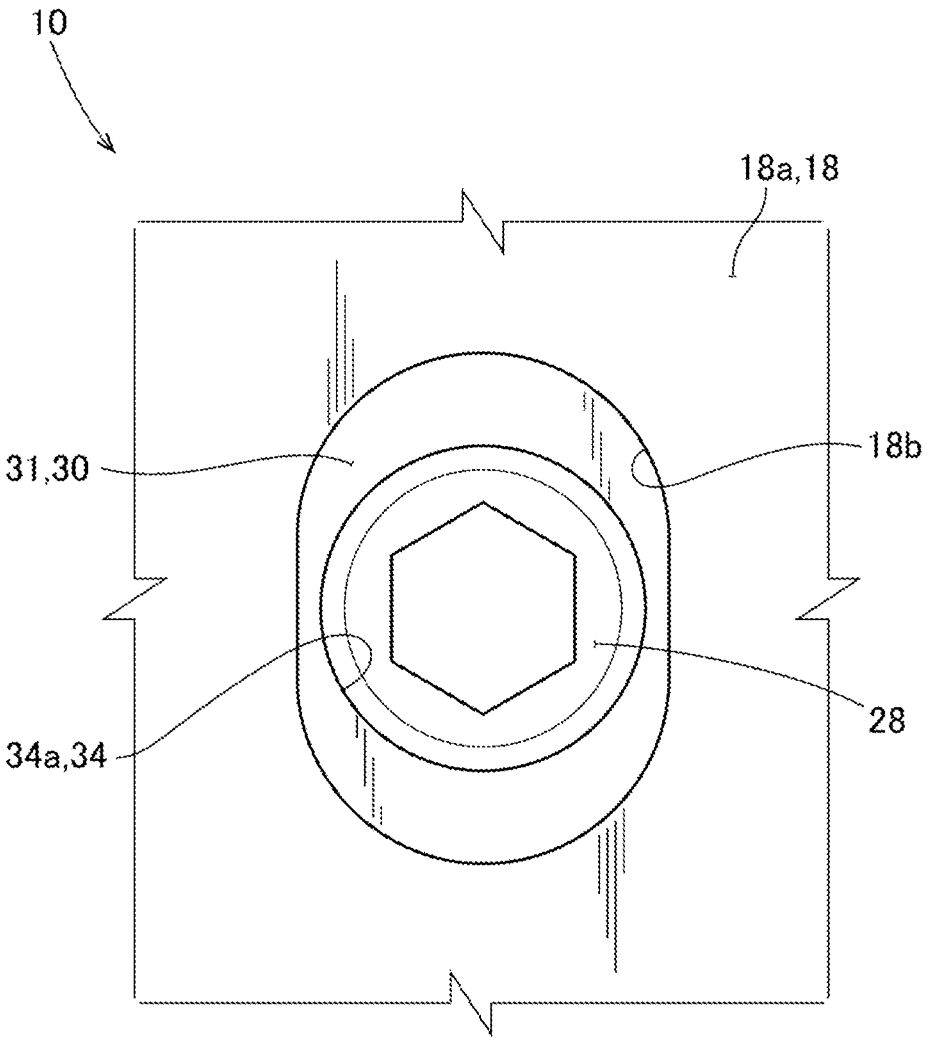
FIG. 4 is a view taken along an arrow 4 in FIG. 3.

Reference is made to FIG. 3. The sleeve 18 includes a cylindrical sleeve main body 18*a* and a sleeve hole 18*b* opened at a position corresponding to the cylinder hole 34. The sleeve hole portion 18*b* is larger than the cylinder hole 34 and larger than the outer diameter of the fixing member 28. Reference is also made to FIG. 4. The sleeve hole 18*b* has an oval shape that is longer in the axial direction than in the circumferential direction.

Reference is made to FIG. 2. The first spring 21 is a compression coil spring, urges the spring receiving portion 13*a* (see FIG. 1) downward, and also urges the slider 23 upward. The urging force of the first spring 21 is greater than the urging force of the second spring 22, and the first spring 21 serves as the main spring.

The second spring 22 is a compression coil spring, urges the slider 23 downward, and also urges the spring receiving member 26 upward. The urging force of the second spring 22 is smaller than the urging force of the first spring 21.

The slider 23 includes a cylindrical slider main body 23*a* provided along the outer peripheral surface of the sleeve 18, and a slider protrusion 23*b* protruding radially outward from the slider main body 23*a*. The slider protrusion 23*b* is formed over the entire periphery of the outer peripheral surface of the slider main body 23*a*, and receives the first spring 21 and the second spring 22 on the lower surface and the upper surface, respectively.

The spring receiving member 26 includes a spring receiving member supporting portion 26*a* whose inner peripheral surface is formed in a female screw shape and that is fastened to the outer peripheral surface of the cylinder 30, and a spring receiving member main body 26*b* that is supported on the spring receiving member supporting portion 26*a* and that receives the second spring 22.

Reference is made to FIGS. 3 and 4. When a force in the rotational direction is applied to the sleeve 18, the sleeve hole 18*b* abuts against the fixing member 28, and rotation of the sleeve 18 is prevented.

The shock absorber described above is summarized below.

Reference is made to FIG. 2. First, a shock absorber 10 includes: a cylinder 30 that is a cylindrical member; a cylindrical slider 23 that is coaxially provided on an outer periphery of the cylinder 30 and that is movable in a direction along an axis CL of the cylinder 30; a first spring 21 that abuts against the slider 23 and that urges the slider 23 in a first direction that is one direction along the axis CL; a second spring 22 that abuts against the slider 23 and that urges the slider 23 in a direction opposite to the first direction; a cylindrical sleeve 18 that is provided between the outer periphery of the cylinder 30 and an inner periphery of the slider 23; a one side movement restriction portion 32 that is located on the outer periphery of the cylinder 30 and that restricts a movement of the sleeve 18 in the first direction by abutting against one end of the sleeve 18; and the other side movement restriction portion 40 that is fixed to the outer periphery of the cylinder 30 and that restricts a movement of the sleeve 18 in the direction opposite to the first direction by abutting against the other end of the sleeve 18.

Reference is also made to FIG. 3. The shock absorber 10 further includes a fixing member 28 that penetrates the sleeve 18 in a radial direction and that restricts a movement of the other side movement restriction portion 40 with respect to the cylinder 30.

The sleeve 18 is sandwiched between the one side movement restriction portion 32 and the other side movement restriction portion 40, so that movement of the sleeve 18 in the axial direction is restricted. By sandwiching the sleeve 18 in the axial direction, the position of the sleeve 18 in the axial direction can be determined while visually recognizing the sleeve 18 from the outer peripheral side. The movement of the other side movement restriction portion 40 in the axial direction relative to the cylinder 30 is restricted by the fixing member 28. In other words, the other side movement restriction portion 40 is prevented from coming off by the fixing member 28. The fixing member 28 penetrates the sleeve 18 in the radial direction, and can be attached while being visually recognized from the outer peripheral side. Since the work can be performed while being visually recognized from the outer peripheral side, the ease of assembling the shock absorber 10 can be improved. It is possible to easily confirm that the sleeve 18 is provided at a correct position.

Further, since both end portions of the sleeve 18 are sandwiched and restricted, by adjusting the heights of the one side movement restriction portion 32 and the other side movement restriction portion 40, it is possible to reliably restrict the sleeve 18 even when the inner diameter of the sleeve 18 varies. Therefore, the assembly efficiency is improved. The backlash in the axial direction can be reduced as compared with position restriction using the snap ring in the related art. Further, both end portions of the cylindrical sleeve 18 abut against the one side movement restriction portion 32 and the other side movement restriction portion 40. Therefore, it is possible to ensure the contact area as compared with a case in which the sleeve 18 is fixed using the snap ring or a case in which the movement of the sleeve 18 is directly restricted using a set screw or the like. The contact surface pressure is lowered, the partial impact load on the one side movement restriction portion 32 and the other side movement restriction portion 40 is reduced, and the sleeve 18 can be fixed more reliably.

Second, in the shock absorber 10 according to the first aspect, the cylinder 30 includes a cylindrical cylinder main body 31 and a cylinder hole 34 opened in the cylinder main body 31. The sleeve 18 includes a cylindrical sleeve main body 18*a* and a sleeve hole 18*b* opened in the sleeve main body 18*a* and at least partially located on an outer periphery of the cylinder hole 34. The fixing member 28 is inserted into a recess 41*a* formed in the other side movement restriction portion 40 through the sleeve hole 18*b* and the cylinder hole 34. The movement of the other side movement restriction portion 40 in the axial direction can be restricted by the fixing member 28.

Reference is made to FIG. 4. Third, in the shock absorber 10 according to the second aspect, the sleeve hole 18*b* is large enough to be spaced apart from the fixing member 28. Reference is also made to FIG. 2. A dimensional error inevitably occurs in each component. The fixing member 28 can be spaced apart from the sleeve hole 18*b*, so that the sleeve 18 can reliably abut against the one side movement restriction portion 32 and the other side movement restriction portion 40. Since the position of the sleeve 18 is restricted at both ends in the axial direction, no shearing load is applied to the fixing member 28.

Reference is made to FIG. 3. Fourth, in the shock absorber 10 according to the second or third aspect, the female screw portion 34*a* is formed in the cylinder hole 34 and/or the other side movement restriction portion 40, and the fixing member 28 includes a male screw portion 28*a*, and the male screw portion 28*a* is fastened to the female screw portion 34*a*. The fixing member 28 can be more reliably fixed.

Fifth, in the shock absorber 10 according to the fourth aspect, the fixing member 28 is fixed such that a distal end of the male screw portion 28*a* bites into the recess 41*a*. Accordingly, the other side movement restriction portion 40 can be firmly fixed. By fixing the fixing member 28 in a manner of biting into the recess 41*a*, it is not necessary to cut the female screw in the recess 41*a*, and the other side movement restriction portion 40 may be positioned anywhere in the circumferential direction. Therefore, the assembly efficiency is improved.

Sixth, in the shock absorber 10 according to any one of the first to fifth aspects, the fixing member 28 is located inside an outer peripheral surface of the sleeve 18. It is possible to prevent the fixing member 28 from interfering with the slider 23 and to secure a long movable range of the slider 23.

Seventh, in the shock absorber 10 according to any one of the first to sixth aspects, the slider 23 is movable to a position overlapping the fixing member 28 with reference to a radial direction. The shock absorber 10 can be shortened in the axial direction and can be made smaller.

Eighth, in the shock absorber 10 according to any one of the first to seventh aspects, a material of the sleeve 18 is stainless steel. The cylinder 30 can be protected by an inexpensive material. Even if the slider 23 comes into contact with the surface, the surface is less likely to be damaged, and the high appearance can be maintained for a long period of time.

Ninth, in the shock absorber 10 according to any one of the first to eighth aspects, the fixing member 28 has a length such that a part of the fixing member 28 is located inside the sleeve hole 18*b*. When a force in the rotational direction is applied to the sleeve 18, the sleeve hole 18*b* abuts against the fixing member 28, and rotation of the sleeve 18 is prevented.

The shock absorber according to the present disclosure has been described taking the side-by-side vehicle as an example. Alternatively, it is capable of applying to a front fork and a rear cushion of a straddle-type vehicle, vehicles other than a straddle-type vehicle, a construction machine, and the like, and is not limited to these types. That is, the present invention is not limited to the embodiment as long as the functions and effects of the present invention are achieved.

INDUSTRIAL APPLICABILITY

The shock absorber according to the present disclosure is suitable for a side-by-side vehicle.

What is claimed is:

1. A shock absorber comprising:

a cylinder that is a cylindrical member;

a slider being cylindrical-shaped, coaxially provided on an outer periphery of the cylinder, and configured to move in a direction along an axis of the cylinder;

a first spring abutting against the slider, and urging the slider in a first direction that is one direction along the axis;

a second spring abutting against the slider, and urging the slider in a direction opposite to the first direction;

a sleeve being substantially cylindrical-shaped, and provided between the outer periphery of the cylinder and an inner periphery of the slider;

a one side movement restriction portion being fixed to the cylinder, and abutting against one end of the sleeve to restrict a movement of the sleeve in the first direction;

an other side movement restriction portion being located on the outer periphery of the cylinder, and abutting against an other end of the sleeve to restrict a movement of the sleeve in the direction opposite to the first direction; and a fixing member penetrating the sleeve in a radial direction to restrict a movement of the other side movement restriction portion with respect to the cylinder.

2. The shock absorber according to claim 1, wherein the cylinder includes a cylinder main body being cylindrical-shaped, and a cylinder hole opened in the cylinder main body, the sleeve includes a sleeve main body being cylindrical-shaped, and a sleeve hole opened in the sleeve main body, in which at least a part of the sleeve hole is located on an outer periphery of the cylinder hole, and the fixing member is inserted into a recess formed in the other side movement restriction portion through the sleeve hole and the cylinder hole.

3. The shock absorber according to claim 2, wherein the sleeve hole is large enough to be spaced apart from the fixing member.

4. The shock absorber according to claim 2, wherein a female screw portion is formed in at least one of the cylinder hole or the other side movement restriction portion, the fixing member includes a male screw portion, and the male screw portion is fastened to the female screw portion.

5. The shock absorber according to claim 4, wherein the fixing member is fixed such that a distal end of the male screw portion bites into the recess.

6. The shock absorber according to claim 2, wherein the fixing member is located inside an outer peripheral surface of the sleeve.

7. The shock absorber according to claim 6, wherein the slider is configured to move to a position overlapping the fixing member with reference to a radial direction.

8. The shock absorber according to claim 2, wherein the fixing member has a length such that a part of the fixing member is located inside the sleeve hole.

9. The shock absorber according to claim 1, wherein a material of the sleeve is stainless steel.

* * * * *